Nov. 8, 1955   O. MUELLER   2,722,946
SELECTOR VALVE
Filed Dec. 22, 1949   2 Sheets-Sheet 1
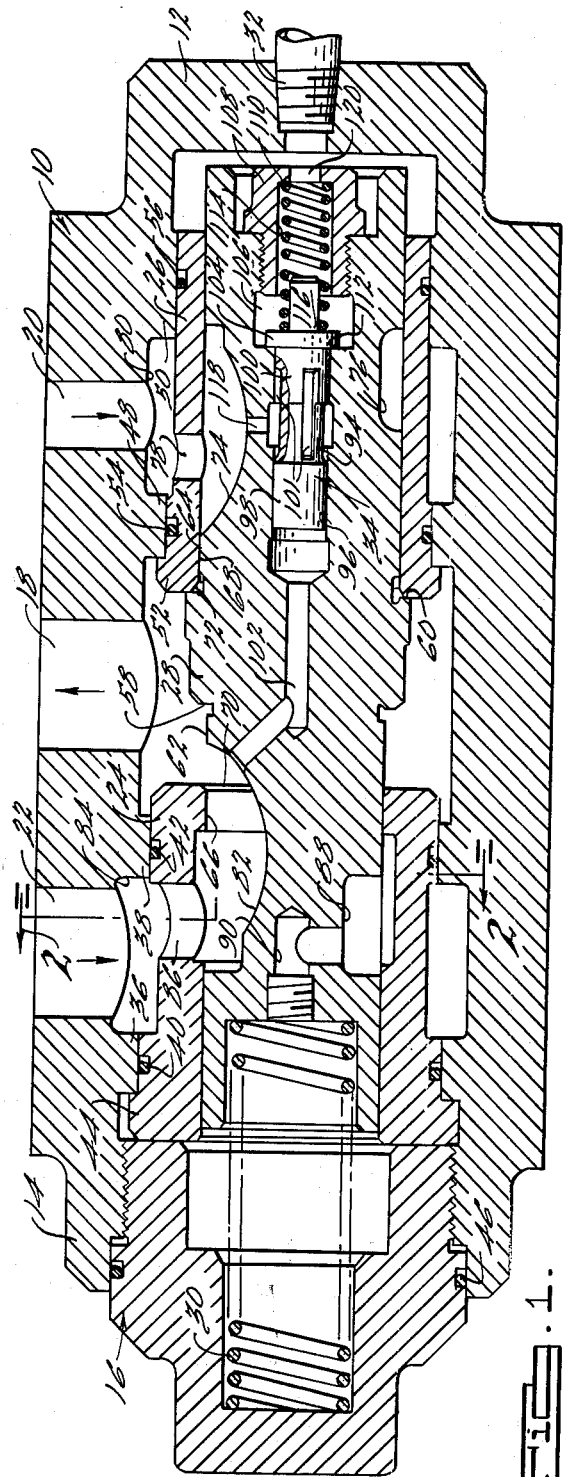
INVENTOR.
Otto Mueller.
BY
Barness, Dickey & Pierce.
ATTORNEYS.

Nov. 8, 1955

O. MUELLER 2,722,946

SELECTOR VALVE

Filed Dec. 22, 1949

INVENTOR.
Otto Mueller.
BY
Harness, Dickey & Pierce
ATTORNEYS.

2,722,946

SELECTOR VALVE

Otto Mueller, Dearborn, Mich.

Application December 22, 1949, Serial No. 134,438

16 Claims. (Cl. 137—620)

This invention relates to pressure-responsive valves, and more particularly to an automatically operable low and high-pressure selector valve adapted for use with multiple pressure systems.

An object of the present invention is to provide a simple, dependable and automatically operable selector valve for use in connection with pneumatic or hydraulic pressure systems.

Another object of the invention is to provide a hydraulic selector valve that is primarily adapted and preeminently suited for use under high-pressure conditions.

Still another object of the invention is to provide a selector valve that first supplies low pressure working fluid to a station, then supplies high pressure fluid to the station, and finally returns automatically to its initial position.

Yet another object of the invention is to provide a hydraulic selector valve having novel means for relieving high pressure fluid in the valve after the high pressure cycle of operation to eliminate the necessity of valving against excessive hydraulic pressures.

A further object of the invention is to provide a novel hydraulic selector valve in which the valve spool and body are formed so as to eliminate binding of the spool in the body during movement thereof between its two limits of travel.

Other objects and advantages of the invention will be apparent during the course of the following description.

In the drawings forming a part of this specification and wherein like numerals are employed to designate like parts throughout the same:

Figure 1 is a longitudinal sectional view through a hydraulic selector valve embodying the invention and showing the valve spool positioned for low-pressure operation;

Fig. 2 is a fragmentary transverse sectional view, taken on the line 2—2 of Fig. 1;

Fig. 3 is a fragmentary longitudinal sectional view, similar to Fig. 1, but showing the valve positioned to relieve high pressure in the valve body preparatory to actuation of the spool.

Figure 4:
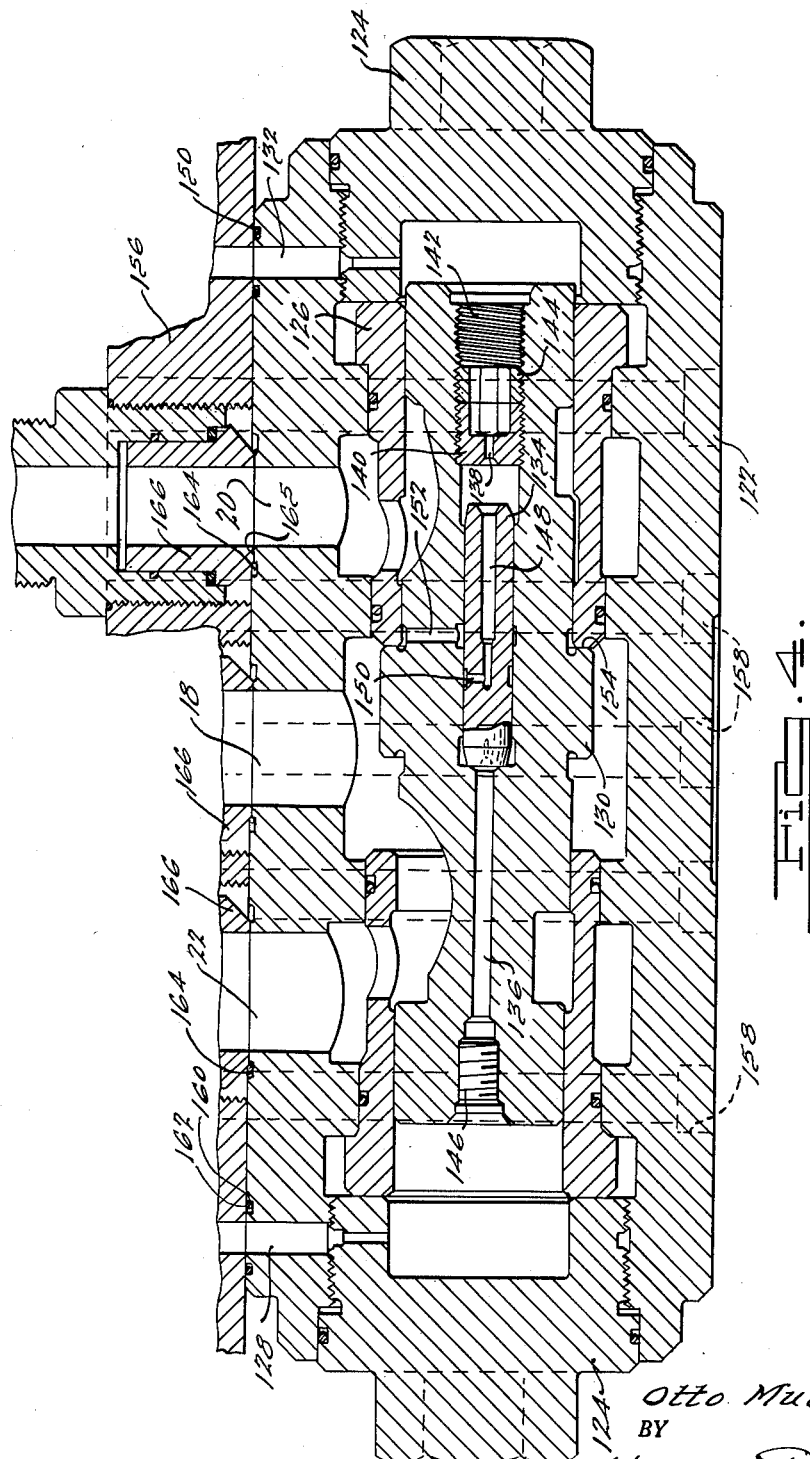
Fig. 4 is a view of structure, similar to that illustrated in Fig. 1, showing a further form of the invention.

In the drawing, wherein for the purpose of illustration is shown a preferred embodiment of the invention, the numeral 10 designates a generally cylindrical hollow valve body having a closed end 12 and an open end 14. The open end 14 is normally closed by a removable threaded plug 16. At substantially the middle of the body 10 is an outlet port 18, and on opposite sides of the outlet port are high and low-pressure inlet ports 20 and 22. Disposed within the valve body 10 at opposite sides of the outlet port 18 are sleeve bearings 24 and 26 which slidably support a valve spool 28. A coil spring 30 interposed between the plug 16 and the adjacent end of the spool 28 normally positions the spool 28, as shown in the drawing, to connect the low-pressure inlet 22 with the outlet 18 and to shut off communication between the high-pressure inlet 20 and the outlet.

Fluid under pressure is introduced into the valve body 10 at the closed end 12 through a pilot line 32. Hydraulic pressure in this end of the body 10 moves the spool 28 axially against spring 30 to shut off communication between the low-pressure inlet 22 and the outlet 18 and to connect the high-pressure inlet 20 with the outlet. The spool 28 remains in this position until hydraulic pressure in line 32 is shut off and high pressure in the valve body 10 is relieved through a valve mechanism designated generally by the numeral 34. When pressure in the body 10 drops a predetermined amount, spring 30 returns spool 28 to its initial position and the relief valve 34 closes preparatory to the next cycle of operation.

The hydraulic control current of a conventional punch press offers a typical environment for the instant valve. When the valve is used in this capacity, low-pressure fluid is directed through the valve with the parts positioned as shown in Fig. 1 to set the work-holding clamps and to advance the punches against the work. Thereafter, the low-pressure inlet 22 is opened to tank, and booster pumps are turned on to supply high pressure liquid to inlet 20. Hydraulic pressure in the pilot line 32 then shifts spool 28 to connect the high-pressure inlet 20 with the outlet 18, and high-pressure liquid is made available for the punching operation. The booster pumps are then shut off and pilot line 32 is connected to tank. Substantially immediately, relief valve 34 operates to relieve pressure in the valve body 10 so that spring 30 can return spool 28 to its initial position. This completes the cycle of operation.

A detailed description of the invention is now given.

Sleeve bearing 24 is supported within the valve body 10 on internal annular flanges 36 and 38 at opposite sides of the low-pressure inlet 22. These flanges 36 and 38 surround and snugly fit the bearing 24, and O rings 40 and 42 assure fluid-tight joints between the bearing and the flanges. In order to hold bearing 24 stationary in the valve body 10, a radial flange 44 is provided at one end of the bearing, which flange is clamped solidly against the internal flange 36 by plug 16. An O ring 46 provides a fluid-tight joint between the plug 16 and the valve body 10.

Sleeve bearing 26 is similarly supported by a pair of internal, radial, annular flanges 48 and 50 formed on the body 10 at opposite sides of the high-pressure inlet 20. The bearing 26 preferably is press-fitted into flanges 48 and 50, and a radial flange 52 on the bearing abuts against flange 48. O rings 54 and 56 seal the joints between bearing 26 and flanges 48 and 50.

When assembling the valve parts the sleeve bearings 26 and 24 are first placed in the body 10 with the O rings 54—56 and 40—42 mounted thereon. During such assembly the O rings 40—42 and 54—56 of course must be forced across the surfaces which support the bearings. During this operation the rings are sometimes worn, twisted or cut so that they fail to seal properly. In order to eliminate or at least mitigate any possibility of damaging the O rings permanently during installation of the bearings, flanges 36, 38, 48 and 50 are made progressively smaller in the order listed. As a result, each O ring need be pushed across only a small supporting area, and the inner rings are no more likely to be damaged than the outer rings.

The spool 28 is generally cylindrical in form, and the opposite terminal portions thereof fit snugly but slidably within the bearings 24 and 26. Intermediate the ends thereof the spool 28 is formed with oppositely facing, radially extending, annular shoulders 58 and 60 which are adapted to abut against the inner ends of bearings 24 and 26 respectively. The spacing between shoulders 58 and 60 is substantially less than the distance between the inner ends of bearings 24 and 26, so that the spool 28 has limited sliding movement in the bearings. In the drawing the spool 28 is shown at the end of its travel to the right, as viewed in Fig. 1, with shoulder 60 against the end of bearing 26. It will be readily apparent, however, that the spool 28 can move to the left until shoulder 58 engages bearing 24. This movement of spool 28 is utilized to connect one or the other of inlet ports 20 and 22 with the outlet 18. Simultaneous communication between the two inlets 20 and 22 and the outlet 18 is prevented by annular surfaces 62 and 64 at the outer sides of shoulders 58 and 60, which surfaces enter and snugly fit the internal bores 66 and 68 of the bearings 24 and 26 before the shoulders seat against the bearings. As the valve spool 28 moves to the left from the position shown in Fig. 1, the annular surface 62 enters bore 66 before the annular surface 64 leaves bore 68. At the instant surface 62 enters bore 66, both inlets 20 and 22 are shut off from outlet 18. As the spool 28 continues to move to the left, the surface 64 moves out of bore 68 to connect the high-pressure inlet 20 with the outlet 18. Almost immediately thereafter, shoulder 58 seats against the end of bearing 24 to completely shut off the low-pressure inlet 22 from the outlet 18. Similarly, when the valve moves to the right as shown in the drawing, the annular surface 64 enters the bore 68 before annular surface 62 moves out of bore 66. Therefore, surface 62 disengages bore 66 and shoulder 60 seats against the end of bearing 26 in the order indicated to connect the low-pressure inlet 22 with the outlet 18 and to shut off communication between the high-pressure inlet 20 and the outlet.

The spool 28 has its shoulder 58 held against the seat of the bearing 24 when high pressure is in the system due to the larger area of the shoulder 60 upon which the pressure is acting. The differential between the shoulders 58 and 60 is predetermined so as to control the movement of the spool 28 to the right, as viewed in the figures. The pressure on the shoulder 60 reduces as the high pressure of the fluid is relieved until the pressure is lowered below that required to hold the spool against the force of the spring 30. When this occurs, the spring 30 shifts the spool 28 to the right. The outer edges of bores 66 and 68 preferably are beveled as at 70 and 72 to reduce the seating area of shoulders 58 and 60.

In order to connect the high-pressure inlet 20 with the outlet 18, the valve spool 28 is formed immediately behind the annular surface 64 with a plurality of longitudinal peripheral grooves 74, and these grooves are connected by an external, annular channel 76 in the spool. A port 78 is provided in sleeve bearing 26 for each of the grooves 74, and an internal annular groove 80 is provided in the body 10 to interconnect the inlet 20 with all of the ports 78. Thus, fluid entering the body through inlet 20 immediately fills the annular channel 80 and simultaneously enters the grooves 74 through ports 78. When the valve spool 28 is positioned as shown in Fig. 1, the grooves 74 are disposed entirely within sleeve bearing 26 so that no escape is provided for the fluid from the grooves 74 to the outlet 18. In this position of the valve parts, the high-pressure inlet 20 is shut off from the outlet 18.

Similarly, in order to establish communication between the low-pressure inlet port 22 and outlet 18, the valve spool 28 is formed immediately behind the annular surface 62 with a plurality of longitudinal, circumferentially spaced grooves 82, each of which communicates with an internal annular channel 84 in the valve body 10 through a port 86. All of the grooves 82 are, in turn, connected by an external annular groove 88 in the spool 28. It will thus be observed that the arrangement is identical to the one described in connection with high-pressure port 20. Fluid entering the body 10 through inlet 22 immediately fills the annular channel 84 and thence enters the grooves 82 simultaneously through ports 86. When the spool 28 is positioned as shown in Fig. 1, fluid entering the valve body 10 through the low-pressure inlet port 22 is free to flow directly to outlet 18. It will be readily appreciated, however, that if the spool 28 is moved to the limit of its travel to the left, grooves 82 will be disposed entirely within sleeve bearing 24 to shut off the low pressure inlet 22. A passage 90 connects channel 88 with the interior of the plug 16 behind spool 28 and the end of the passage which opens with the plug preferably is threaded to receive a tool suitable for removing the spool from the body 10. Some provision of this character is necessary when removing the spool 28 because suction tends to hold it in the body.

When inlet 22 is connected to tank, low-pressure fluid is directed to pilot line 32 and high-pressure fluid is directed to inlet 20, the spool 28 immediately shifts to the left against the action of spring 30 to stop communication between inlet 22 and outlet 18 and to connect inlet 20 to the outlet. Manifestly there is no hydraulic pressure in the valve body 10 to oppose shifting of spool 28 when the low-pressure inlet 22 is connected to tank. However, when it is desired to shut off the high-pressure liquid, it is not practical to connect inlet 20 to the tank because of difficulties encountered in valving against the exceedingly high pressure developed during the high-pressure cycle of operation. After the high-pressure pumps are stopped, there is a solid body of high-pressure liquid in the valve body and between the pumps and the actuated parts. Pressure exerted by this liquid against the shoulder 60 prevents spring 30 from retracting the spool 28. Consequently, this pressure must be relieved before spool 28 will move to the low-pressure position. Moreover, it is desirable in this connection that the high pressure be relieved in such manner as to prevent spring 30 from slamming the shoulder 60 against the end of sleeve bearing 26. If such slamming occurs, the impact makes the valve noisy in operation and eventually damages the valve seat.

In order to obviate the above contingencies the high-pressure pumps are first stopped and the pilot line 32 is then opened to tank. This relieves pressure in the body 10 at the right of spool 28. High pressures within the valve body 10 at the inlet 20 are then released gradually by the valve mechanism 34. The gradual reduction in pressure at the inlet 20 offers progressively diminishing resistance to spring 30 so that the latter shifts spool 28 quietly to the right.

More particularly it will be observed that the valve mechanism 34 comprises a piston valve 94 which is mounted for limited sliding movement in a bore 96 provided at the high-pressure end of spool 28. The valve 94 is a differential piston having a relatively small head 98 at one end and a relatively large head 100 containing a plurality of slots 101 at the other end thereof. The relatively small head 98 is disposed at the inner end of bore 96, and the latter is connected to one of the longitudinal slots 82 by a passage 102. Contrariwise, the relatively large head 100 is disposed in the outer end of bore 96. At the outer end of head 100 is a radial flange 104 which operates in a relatively large chamber 106. A plug 108 screwed into the chamber 106 seats a spring 110 which bears against the valve 94 to hold flange 104 solidly against a seat 112 around the bore 96. The outer end of spring 110 preferably is received in a socket 114 in plug 108, and the inner end thereof is piloted over a stud 116 on the valve 94. Spring 110 normally maintains the valve 94 in closed position as shown in Fig. 1. However, it will be observed that radial passages 118 connect grooves 74 with the bore 96 intermediate heads 98 and 100. A port 120 in the end of plug 108 effects communication between pipe 32 and valve 94.

As a result of the above, hydraulic fluid in the valve body 10 during the low-pressure cycle of operation may shift the piston valve 94 to the right, as viewed in the drawing, but operation of the valve at this time and in this manner serves no useful purpose. Fluid cannot escape to the right past valve 94 and the latter is returned immediately to the left by spring 110 as soon as the low-pressure fluid is shut off at inlet 22. During the high-pressure cycle of operation, any leakage past piston valve 94 escapes through passage 102 and is returned to tank. Passage 102 thus prevents fluid from being trapped in the bore 96 behind piston valve 94 preventing operation of the same. At the end of the high-pressure cycle of operation, fluid pressure to pipe 32 is shut off and the latter is connected to the tank. Hydraulic pressure against the head 104 of valve 94 is reduced to zero almost immediately when line 32 is opened to tank so that hydraulic pressure against the inner annular surface of head 100 overcomes the action of spring 110 and forces valve 94 to the right. As soon as the head 100 cracks open (Fig. 3), high-pressure liquid in the valve body 10 leaks through passage 118 past valve 94 and passes through pipe 32 to the tank. As soon as hydraulic liquid begins to leak past valve 94, fluid pressure in the body 10 begins to fall, and, as soon as the hydraulic pressure becomes less than the resilient pressure exerted against the piston by spring 30, spool 28 moves to the right. Manifestly, movement of the spool 28 is snubbed by hydraulic liquid in the high-pressure side of the body 10. In this manner, spring 30 returns spool 28 to the right preparatory to a low-pressure cycle of operation without slamming or appreciable noise.

If desired, the spring 30 can be omitted and the spool 28 operated hydraulically in both directions by merely connecting a hydraulic line to the left-hand end of the body, as illustrated at 128 in Fig. 4, so that hydraulic liquid can be introduced into the space formerly occupied by the spring. If this is done, the passage 90 must, of course, be plugged. By using the pressure-reducing valve 94, it is possible to reduce the high pressure of the fluid on the left of the spool 28 before the spool is shifted, thereby reducing the hydraulic shock and attending hammering in the system. This is caused by the instantaneous expansion of the fluid which compresses at the rate of approximately 1% per 3000 p. s. i., when directly released.

Referring to Fig. 4, a further form of the invention is illustrated, that wherein a valve body 122 is similar to the valve body 10 of Fig. 1, with the exception that like plugs 124 are threaded in each of the ends. With this arrangement, the sleeve bearings 126 are exactly alike and are press-fitted into the body from the opposite ends thereof. A pilot inlet port 128 extends through the body and the plug 124 at the left-hand end of the valve for introducing pilot pressure at the end of the valve spool 130 for returning the spool to the right after the high pressure has been relieved from the system.

A low-pressure port 132 is provided through the body and the plug 124 at the right-hand end thereof for introducing low pressure fluid to the right-hand end of the spool 130 for producing the shifting of the spool to the left to connect the high-pressure port 20 to the outlet port 18, thereby cutting off low pressure from the low-pressure port 22 and introducing the high pressure fluid into the system as above described. The spool 130 has a balanced spool 134 disposed therein, the left end being connected through a passageway 136 to the pilot pressure from the port 128, the opposite end being connected through a relief aperture 138 in a threaded plug 140 to the low-pressure port 132 at the right-hand end of the valve. The plug 140 with the desired size relief aperture 138 is threaded into the threaded aperture 142 and is locked into position by a lock nut 144. The remaining portion of the thread 142 is available for receiving the thread of a tool by which the spool and sleeve bearing 126 may be pulled from the valve body. A similar thread 146 is provided in the end of the passageway 136 which may be engaged by a tool for pulling the spool 130 and the sleeve bearing 126 at the left-hand end from the body. A passageway 148 extends from the right-hand end of the spool 134 outwardly at 150 in communication with the passageway 152 through the spool 130 when the spool 134 is shifted to the right and the spool 130 is shifted to the left.

In operation, the pilot pressure of, for example, 400 pounds, is constantly applied to the port 128 at the left-hand end of the valve body to retain the spool 130 to the right, as illustrated in the figure. This connects the low-pressure inlet port 22 to the outlet port 18. When it is desirable to apply high pressure to the outlet port and system, the low pressure at, for example, 1000 pounds, is introduced into the port 132 at the right-hand end of the body 122 to cause the valve 130 to shift to the left, forcing the pilot fluid through a relief valve provided in the pilot system. This also shifts the spool 134 to the left within the spool 130, thereby disconnecting passageway 150 from passageway 152. The shifting of the spool 130 to the left disconnects the fluid from the low-pressure port 22 to the outlet port 18 and connects the high-pressure fluid, for example, at 5000 pounds, from the high-pressure port 20 to the outlet port 18.

When it is desired to cut off the high-pressure fluid and again supply low-pressure fluid to the outlet port, the low-pressure fluid from the port 132 is connected to tank, thereby removing pressure from the right-hand end of the spool 130. This high pressure fluid will be acting upon the shoulder 154 of the spool 130 which, for example, has an area of approximately 1.362 square inches as compared to 3.546 square inches at the ends of the spool. Upon the relief of the pressure on the right-hand end of the spool 134, the pilot pressure on the left-hand end will cause the spool 134 to shift to the right, thereby connecting passageway 150 to passageway 152 and bleeding off the high pressure fluid through the relief orifice 138 in the plug 140. This will cause the high pressure to drop and when it reaches approximately 1000 pounds, acting upon the shoulder 154, the force exerted thereby on the spool 130 will be overcome by the 400 pound pilot pressure acting upon the left-hand end of the spool which thereby causes the spool to shift to the right. This shifting will occur without the hammer blow effect which normally takes place when shifting a spool in the presence of high pressure, the present arrangement relieving the pressure before the shifting occurs. The operation of the valve in Fig. 4 is similar to that of Fig. 1 with the exception that the springs 110 and 30 have been omitted and a simpler spool arrangement is thereby provided.

Referring again to Fig. 4, it will be noted that the valve body 122 is mounted upon a mounting plate 156 by a plurality of bolts 158 aligned on both sides of the body. The pilot and low-pressure ports 128 and 132 have an annular channel 160 provided thereabout in each of which an O-ring 162 is mounted to project beyond the face of the valve body to thereby contact the plate 156 when the body is drawn tight against the plate by the bolts 158. Similar annular recesses 164 are provided about the ports 18, 20 and 22 outwardly of the surfaces 165 which are lapped to accurate flat washerlike platforms. Pressure-actuated sleeves 166 contact each of the platforms to form a seal therewith in the manner as explained in the copending application of Otto Mueller, Serial No. 43,914, filed August 12, 1948. The sleeve has a tapered end reducing the end face area which is lapped to readily seal with the engaged face of the platform. The sleeve is mounted in the plate 156 for longitudinal movement so that pressure of the fluid within the sleeve acting on the outer end thereof will urge the sleeve against the platform with increasing force as the pressure of the fluid increases, thus assuring the establishing of a leakproof joint. With this arrangement, the valve may be removed from the supporting plate 156 by the removal of the bolts 158 without breaking any fluid connections other than those formed directly with the plate by the O-rings 162 of the sleeves 166. Similarly, it is only necessary to bolt the body into position on the plate 156 to connect the passageways 128, 132, 18, 20 and 22 to their respective passageways in the system.

Having thus described the invention, I claim:

1. A selector valve comprising a generally cylindrical valve body having an outlet, longitudinally spaced high and low pressure inlets at opposite sides of said outlet, and confronting, radial, internal valve seats on opposite sides of said outlet; a valve spool slidable in said body to selectively connect one or the other of said inlets with said outlet, said spool having spaced, radial shoulders engageable with said seats to control communication between said inlets and said outlet; spring means in the body acting against said spool to position the same so as to establish communication between the low pressure inlet and said outlet; selectively operable hydraulic means acting counter to said spring means for shifting the spool longitudinally in the body to shut off communication between said low pressure inlet and said outlet and to establish communication between said high pressure inlet and said outlet; a differential piston valve slidable in the spool and having relatively small and relatively large head portions at opposite ends thereof, spring means acting against the relatively large head portion of said piston valve to hold the same normally closed; and a passage establishing communication between said high pressure inlet and said piston valve intermediate said heads whereby hydraulic pressure in the valve at said high pressure inlet acting against said differential piston valve when the spool is positioned to establish communication between said high pressure inlet and said outlet opens the latter as soon as hydraulic pressure behind the valve is relieved whereby to relieve hydraulic pressure in the body sufficiently to permit said spring to return the spool to its initial position.

2. A selector valve comprising a generally cylindrical valve body having an outlet, longitudinally spaced high and low pressure inlets at opposite sides of said outlet, and confronting, radial, internal valve seats on opposite sides of said outlet; a valve spool slidable in said body to selectively connect one or the other of said inlets with said outlet, said spool having spaced, radial shoulders engageable with said seats to control communication between said inlets and said outlet; spring means in the body acting against said spool to position the same so as to establish communication between the low pressure inlet and said outlet; selectively operative hydraulic means acting counter to said spring means for shifting the spool longitudinally in the body to shut off communication between said low pressure inlet and said outlet and to establish communication between said high pressure inlet and said outlet; and hydraulically operable means actuated by hydraulic liquid in the body at said high pressure inlet when said hydraulic means is rendered inoperative to relieve pressure in the body sufficiently so that said spring means can return the spool to its normal or initial position.

3. A pressure-responsive valve comprising a cylindrical body having opposite high and low pressure ends each provided with an inlet, and an outlet intermediate said inlets; a differential spool longitudinally slidable in said body, said spool having a relatively small portion in the low pressure end of the body and a relatively large portion in the high pressure end thereof, whereby hydraulic liquid in the body acts against said spool to normally position the same for establishing communication between the low pressure inlet and said outlet, said spool being shiftable back and forth in said body to selectively connect one or the other of said inlets with said outlet; spring means in said body acting against said spool to assist hydraulic pressure in the body in positioning the spool to normally establish communication between the low pressure inlet and said outlet; hydraulic means acting counter to said spring means for shifting the spool in the body against the action of said spring, whereby to establish communication between the high pressure inlet and said outlet, and a normally closed, spring-loaded differential piston valve in said spool, said differential piston valve being in communication with the high pressure inlet and being movable to open position by fluid pressure in the body at said high pressure inlet and operable in said position to relieve high pressure hydraulic liquid from the body.

4. In a valve for connecting a high pressure inlet to an outlet, a spool shiftable to connect the inlet and outlet when pressure is applied to one end of the spool, a second spool carried by said first spool and communicating with the high pressure fluid from said inlet, said pressure operating said second spool to open position for dissipating the pressure of the fluid trapped within the inlet and outlet passageways when the applied pressure is relieved from the end of the first spool, and means for shifting said first spool to disconnect the inlet from said outlet after the pressure is dropped a predetermined amount.

5. In a valve for connecting a high pressure inlet to an outlet, a valve body, a spool in said body shiftable to connect the inlet and outlet, said body having means for the connection of a pilot line for conducting a fluid to one end of the spool for shifting said spool, a second spool carried by said first spool and communicating said high-pressure fluid to said pilot line when pressure is relieved from said line, a spring for holding said second spool closed when assisted by the pressure of said line and which is overcome by said high pressure when pressure is relieved from said line for permitting the high-pressure fluid trapped in the inlet and outlet to be relieved gradually to overcome shock when the first spool is returned to initial position, means exerting a predetermined pressure on the end of the first spool opposite to that supplied by the pilot line, said first spool having a surface acted upon by the high pressure fluid to retain the spool in shifted position against the action of said fluid until the high pressure fluid has dropped to a predetermined lower pressure by the operation of said second spool.

6. In a valve for connecting a high pressure inlet to an outlet, a valve body, a spool in said body shiftable to connect the inlet and outlet, said body having means for the connection of a pilot line for conducting a fluid to one end of the spool for shifting said spool, a second spool carried by said first spool and communicating said high-pressure fluid to said pilot line when pressure is relieved from said line, a spring for holding said second spool closed when assisted by the pressure of said line and which is overcome by said high pressure when pressure is relieved from said line for permitting the high-pressure fluid trapped in the inlet and outlet to be relieved gradually to overcome shock when the first spool is returned to initial position, said body having means for the connection of a pilot line for conducting a fluid for exerting a predetermined pressure on the end of the first spool opposite to that supplied by the pilot line, said first spool having a surface acted upon by the high pressure fluid to retain the spool in shifted position against the action of said fluid from said second pilot line until the high pressure fluid has dropped to a predetermined lower pressure by the operation of said second spool.

7. In a valve for connecting a high pressure inlet to an outlet, a valve body, a spool shiftable to connect the inlet and outlet when pressure is applied to one end of the spool, a passageway in one end of the body for applying pressure to said one end of the spool, a passageway in the other end of the body for applying pressure to the other end of the spool, a second spool carried by said first spool communicating with the high pressure fluid from said inlet in one position and in said position with said first passageway, the opposite end of said second spool being in communication through said first spool to said second passageway whereby when fluid is cut off from said first passageway, the fluid in the second passageway shifts said second spool into communicating position with the high fluid pressure remaining after the flow thereof is cut off which is relieved by said first passageway.

8. In a valve for connecting a high pressure inlet to an outlet, a valve body, a spool shiftable to connect the inlet and outlet when pressure is applied to one end of the spool, a passageway in one end of the body for applying pressure to said one end of the spool, a passageway in the other end of the body for applying pressure to the other end of the spool, a second spool carried by said first spool communicating with the high pressure fluid from said inlet in one position and in said position with said first passageway, the opposite end of said second spool being in communication through said first spool to said second passageway whereby when fluid is cut off from said first passageway, the fluid in the second passageway shifts said second spool into communicating position with the high fluid pressure remaining after the flow thereof is cut off which is relieved by said first passageway, said first passageway having a metering orifice for relieving said high pressure at a predetermined rate.

9. In a valve for connecting a high pressure inlet to an outlet, a valve body, a spool shiftable to connect the inlet and outlet when pressure is applied to one end of the spool, a passageway in one end of the body for applying pressure to said one end of the spool, a passageway in the other end of the body for applying pressure to the other end of the spool, a second spool carried by said first spool communicating with the high pressure fluid from said inlet in one position and in said position with said first passageway, the opposite end of said second spool being in communication through said first spool to said second passageway whereby when fluid is cut off from said first passageway, the fluid in the second passageway shifts said second spool into communicating position with the high fluid pressure remaining after the flow thereof is cut off which is relieved by said first passageway, said first spool having a shoulder subject to the high pressure fluid when the first spool is shifted to communicate the high pressure fluid to the outlet which retains the first spool shifted until the high pressure has been relieved through the second spool and the pressure in the second passageway overcomes the force of the pressure on the shoulder which thereby shifts the first spool to its initial position.

10. In a valve for connecting a high pressure inlet to an outlet, a valve body, a valve spool within said body, said body having a fluid pressure passageway at each end communicating with each end of the valve spool for shifting the spool in either direction, means within said valve for relieving the high pressure fluid after the valve has been shifted to communicate the high pressure fluid with the outlet and fluid at high pressure has been trapped therein when the flow thereof is interrupted, and means for retaining said valve spool in shifted position until the high pressure has been relieved below a predetermined desired pressure.

11. In a valve for connecting a high pressure inlet to an outlet, a valve body, a spool shiftable to connect the inlet and outlet when pressure is applied to one end of the spool, a passageway in one end of the body for applying pressure to said one end of the spool, means in the other end of the body for applying pressure to the other end of the spool, a second spool carried by said first spool communicating with the high pressure fluid from said inlet in one position and in said position with said passageway, the opposite end of said second spool being in communication through said first spool with a supply of fluid which shifts said second spool into communication with the high fluid pressure remaining after the flow thereof is cut off which is relieved by said passageway, after which said means shifts said first spool to the end of the body having said passageway.

12. In a valve for connecting a high pressure inlet to an outlet, as recited in claim 5, wherein said pressure exerting means is a spring.

13. In a valve for connecting a high pressure inlet to an outlet, as recited in claim 11, wherein said means in the other end of the body is a spring.

14. In a valve for connecting a high pressure inlet to an outlet, as recited in claim 4, wherein said means for shifting said first spool is a spring.

15. In a valve for connecting a high pressure inlet to an outlet, as recited in claim 4, wherein said means for shifting said first spool is a fluid under pressure.

16. In a valve for connecting a high pressure inlet to an outlet, as recited in claim 4, wherein the second spool is urged into said first spool by spring means.

References Cited in the file of this patent
UNITED STATES PATENTS

| | | |
|---|---|---|
| 1,294,151 | Page | Feb. 11, 1919 |
| 1,333,660 | Hutchins | Mar. 16, 1920 |
| 1,551,128 | Williams | Aug. 25, 1925 |
| 1,582,246 | Buchanan | Apr. 27, 1926 |
| 2,020,833 | Hansen | Nov. 12, 1935 |
| 2,276,221 | Magnesen | Mar. 10, 1942 |
| 2,390,892 | McCormack | Dec. 11, 1945 |
| 2,411,837 | Stephens | Nov. 26, 1946 |
| 2,504,013 | Ellis | Apr. 11, 1950 |